(12) United States Patent
Combes et al.

(10) Patent No.: US 7,950,604 B2
(45) Date of Patent: May 31, 2011

(54) ENGINE MOUNTING STRUCTURE FOR AN AIRCRAFT

(75) Inventors: Stephane Combes, Buzet sur Tarn (FR); Laurent Lafont, Pechbusque (FR)

(73) Assignee: AIRBUS France, Toulouse (FR)

( * ) Notice: Subject to any disclaimer, the term of this patent is extended or adjusted under 35 U.S.C. 154(b) by 681 days.

(21) Appl. No.: 11/916,537

(22) PCT Filed: Jun. 27, 2006

(86) PCT No.: PCT/EP2006/063598
§ 371 (c)(1),
(2), (4) Date: Dec. 5, 2007

(87) PCT Pub. No.: WO2007/000456
PCT Pub. Date: Jan. 4, 2007

(65) Prior Publication Data
US 2008/0197262 A1    Aug. 21, 2008

(30) Foreign Application Priority Data
Jun. 29, 2005   (FR) ...................................... 05 51819

(51) Int. Cl.
*B64D 27/00*    (2006.01)

(52) U.S. Cl. ......................................... 244/54; 248/554
(58) Field of Classification Search ................... 244/54, 244/53 R, 55; 248/554; 60/796, 797
See application file for complete search history.

(56) References Cited

U.S. PATENT DOCUMENTS

| 4,725,019 | A | * | 2/1988 | White ............................. 244/54 |
| 6,648,271 | B2 | * | 11/2003 | Levert et al. ................... 244/54 |
| 2005/0116093 | A1 | * | 6/2005 | Machado et al. .............. 244/54 |

FOREIGN PATENT DOCUMENTS

| EP | 1 031 507 | 8/2000 |
| FR | 2 770 486 | 5/1999 |
| FR | 2 862 944 | 6/2005 |

* cited by examiner

*Primary Examiner* — Timothy D Collins
*Assistant Examiner* — Brian M O'Hara
(74) *Attorney, Agent, or Firm* — Oblon, Spivak, McClelland, Maier & Neustadt, L.L.P.

(57) ABSTRACT

An engine attachment pylon for an aircraft including an aft engine attachment fitted with an aft attachment body and two lateral brackets each including a longitudinal portion in contact with an inner face of the lateral panel associated with it and mounted fixed on the same inner face, and a transverse portion including an attachment interface for the aft attachment body, the transverse portion configured to pass through a recess formed on the associated lateral panel.

19 Claims, 5 Drawing Sheets

ENGINE MOUNTING STRUCTURE FOR AN AIRCRAFT

TECHNICAL DOMAIN

This invention relates in general to an engine attachment pylon for an aircraft such as a turbojet. This type of attachment pylon is also called an EMS (Engine Mounting Structure), that can be used to suspend the turbojet below the aircraft wing, or to fit this turbojet above the same wing, through a plurality of engine attachments.

STATE OF PRIOR ART

Such an attachment pylon is designed to form an attachment interface between an engine such as a turbojet and an aircraft wing. It transmits forces generated by its associated turbojet to the structure of this aircraft, and it also enables routing of fuel, electrical, hydraulic and air systems between the engine and the aircraft.

In order to transmit forces, the pylon comprises a rigid structure, frequently of the "box" type, in other words formed by the assembly of upper and lower spars and two lateral panels connected to each other through transverse ribs.

The pylon is also provided with a mounting system inserted between the turbojet and the rigid structure of the pylon, this system globally comprising at least two engine attachments, usually at least one forward attachment and at least one aft attachment.

Furthermore, the assembly system comprises a device for resisting thrust forces generated by the turbojet. In prior art, this device, for example is in the form of two lateral connecting rods connected firstly to an aft part of the turbojet fan casing, and secondly to an aft attachment fixed to the casing of this turbojet.

Similarly, the attachment pylon also comprises a second mounting system inserted between the rigid structure of this pylon and the aircraft wing, this second system typically being composed of two or three attachments.

Finally, the pylon is provided with a secondary structure for segregation and holding systems in place, while supporting aerodynamic fairings.

As mentioned above, a conventional attachment pylon according to prior art is provided with an aft attachment usually rigidly fixed to the lower spar of the box. This special feature means that access inside the box is necessary to mount the aft attachment. However, access inside the pylon is often very limited, which inevitably leads to difficulties in assembly, that are penalising in terms of cost and time.

OBJECT OF THE INVENTION

Therefore, the object of the invention is to propose an aircraft engine attachment pylon at least partially overcoming the disadvantages mentioned above related to embodiments according to prior art, and also to present an aircraft with at least one such pylon.

To achieve this, the object of the invention is an aircraft engine attachment pylon, this pylon being of the box type being formed by the assembly of an upper spar, a lower spar, two lateral panels and transverse ribs connecting the spars and panels, the pylon also comprising an aft engine attachment fitted with an aft attachment body. According to the invention, the aft engine attachment is provided with two lateral brackets each comprising a longitudinal portion in contact with an inner face of the lateral panel associated with it and mounted fixed on this same inner face, and a transverse portion comprising an attachment interface of the aft attachment body, this transverse portion being arranged so as to pass through a recess formed on the associated lateral panel.

Thus, the proposed invention enables an easy assembly of the aft engine attachment fitted on the attachment pylon, given that the attachment interfaces of the aft attachment body are therefore located outside the box. In this solution in which the longitudinal portion of the lateral bracket preferably closes off its associated recess, it is understood that the transverse portion projects from the lateral panel towards the outside, passing through the recess provided for this purpose. Thus, this particular configuration makes the attachment interface directly and easily accessible for an operator close to the box, and for example who would like to fit bolts on this attachment interface.

Preferably, the lower spar is provided with a narrowing composed of two indents in which the two lateral brackets of the aft engine attachment are housed. Therefore in other words, the lower spar is curved along the transverse direction at the aft engine attachment in order to compensate for the thickness of the longitudinal portion of the lateral brackets of this aft attachment. The indents combined with the presence of the two lateral brackets result in a box for which the two sides surfaces have an approximately straight shape, which also authorizes optimisation of aerodynamic shapes of the pod at these brackets.

Furthermore, note that this specific feature generates savings in terms of the total mass of the attachment pylon, because the narrowing reduces the width of the aft attachment body below the lower spar, and the width of the box at the aft engine attachment.

Preferably, the recess in each of the two lateral panels is open downwards. Furthermore, note that the lower spar preferably comprises two lateral flanges installed fixed on the two lateral panels, so that the longitudinal portion of each of the two lateral brackets of the aft attachment can be inserted between one of the two lateral flanges and one of the two lateral panels. In this respect, note that contact between the longitudinal portion and the last two elements mentioned is also required.

Also preferably, the transverse portion of each of the two lateral brackets of the aft attachment comprises an attachment plate defining the attachment interface of the aft attachment body, and reinforcing ribs fixed to the attachment plate and the longitudinal portion. In such a case, it may be preferable that the reinforcing ribs are oriented along parallel planes defined by a transverse direction and a vertical direction of the pylon.

Preferably, the attachment interface of each of the two lateral brackets of the aft attachment is in the form of a plane surface oriented in the direction of a plane defined by the transverse direction and a longitudinal direction of the pylon.

Preferably, each of the two lateral brackets of the aft attachment is made in a single piece, and preferably from titanium.

Note that the aft attachment is preferably designed so as to define two half-attachments each capable of resisting forces applied along a vertical direction of the pylon.

If it is required for this aft attachment to also resist forces applied along the transverse direction of the pylon, it would be possible for this aft engine attachment to also comprise a first shear pin capable of resisting forces applied along the transverse direction of this pylon, this first shear pin passing through the lower spar and being provided with a lower end housed in the aft attachment body, this lower end being provided with a reaming through which a first pin passes, and also passing through the aft attachment body.

Therefore this arrangement provides not only the possibility for the aft attachment to resist forces applied along the transverse direction of the pylon, but also, due to cooperation between the reaming and the pin passing through the aft attachment body, to resist forces applied along the vertical direction of the pylon if there is failure/breakage of one of the two lateral brackets. Consequently, this ingenious solution provides a <<Fail Safe>> function for transmission of forces along the vertical direction, without significantly increasing the complexity of the design of the aft attachment body. In particular, this part may still be made in a single piece, preferably from titanium, which advantageously causes a saving in terms of mass and cost.

Secondly, in order to obtain a statically determinate attachment system, a functional clearance can be provided between the pin and the shear pin reaming, so that forces along the vertical direction pass through this pin only if there is a failure/breakage in one of the two lateral brackets.

Preferably, the aft engine attachment also comprises a second shear pin capable of resisting forces applied along the transverse direction of the pylon, only if a failure occurs in the first shear pin, this second shear pin passing through the lower spar and being provided with a lower end housed in the aft attachment body, this lower end being provided with a reaming through which a second pin passes, that also passes through the aft attachment body. Consequently, it should be understood that this second shear pin performs the <<Fail Safe>> function to transmit forces applied along the transverse direction, which implies that the pin is preferably mounted with a clearance in a housing in the aft attachment body. Furthermore, the second pin cooperates with the reaming while providing a second <<Fail Safe>> function for transmission of forces applied along the vertical direction, which advantageously leads to the presence of a distinct safety system for each of the two lateral brackets of the aft attachment. To achieve this, it is preferred to place the two shear pins close to the two lateral brackets.

The two so-called <<Fail Safe>> functions associated with the two lateral brackets can be further improved by assuring that the aft engine attachment also comprises a first ancillary pin passing through the lower spar and provided with a lower end housed in the aft attachment body, this lower end being provided with a reaming through which the first pin passes, and this attachment also comprises a second ancillary pin passing through the lower spar and being provided with a lower end housed in the aft attachment body, this lower end being provided with a reaming through which the second pin passes.

Preferably, the first and second pins are oriented along the longitudinal direction of the pylon. Furthermore, the first and second shear pins and the first and second ancillary pins each have an upper end passing through the same transverse rib on the pylon.

Another purpose of the invention is an aircraft with at least one attachment pylon like that described above.

Other advantages and characteristics of the invention will become clear after reading the detailed non-limitative description given below.

BRIEF DESCRIPTION OF THE DRAWINGS

This description will be made with reference to the appended drawings wherein.

DETAILED PRESENTATION OF PARTICULAR EMBODIMENTS

Figure 1:
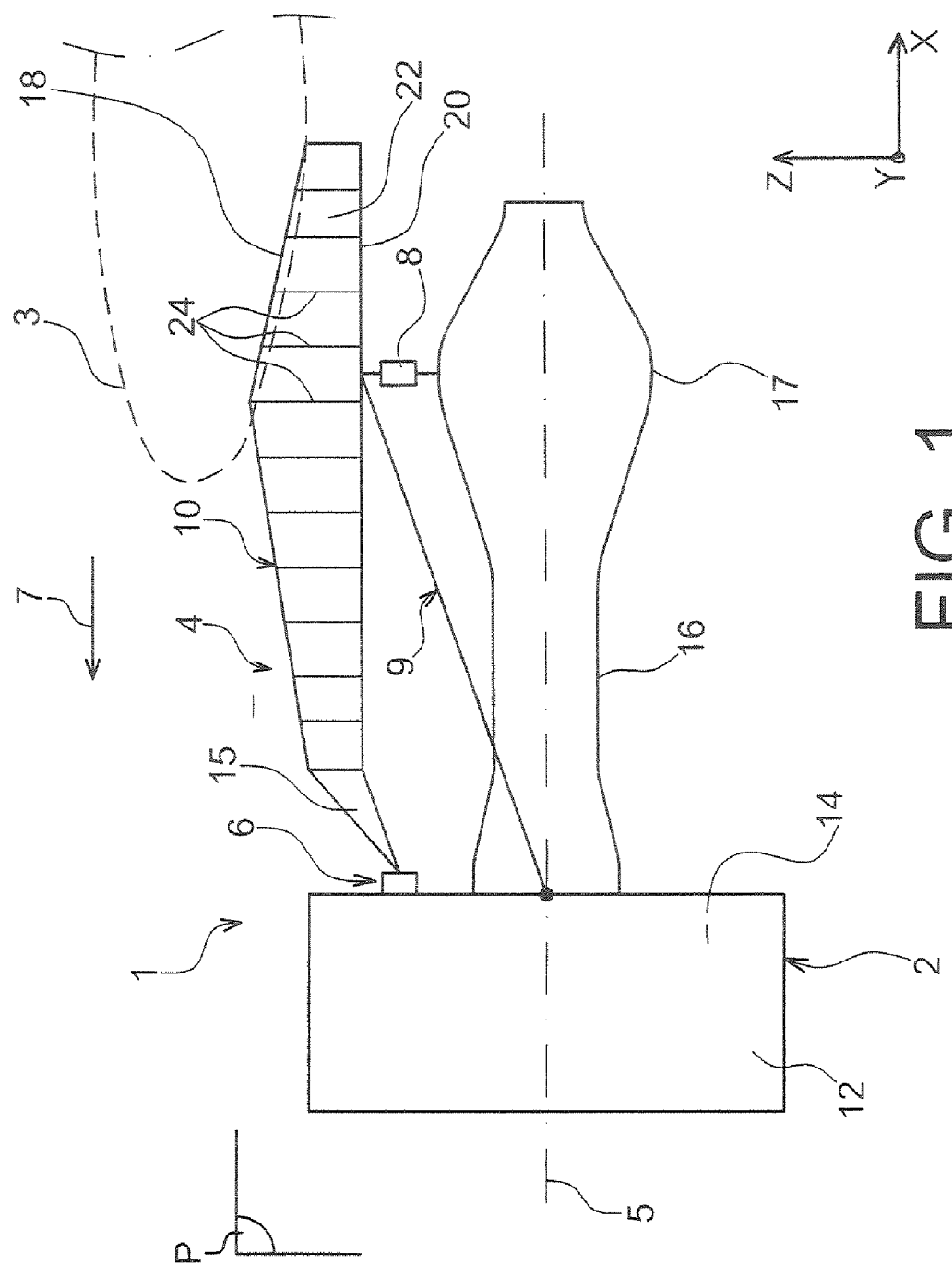
FIG. 1 shows a partially diagrammatic side view of an aircraft engine assembly, comprising an attachment pylon according to one preferred embodiment of this invention.

With reference to FIG. 1, the figure shows an aircraft engine assembly 1 designed to be fixed under a wing 3 of this aircraft (not shown), this assembly 1 according to one preferred embodiment of this invention being provided with an attachment pylon 4.

Globally, the engine assembly 1 comprises an engine such as a turbojet 2 and the attachment pylon 4, the attachment pylon in particular being provided with a plurality of engine attachments 6, 8 and 9, and a rigid structure 10 to which these attachments are fixed. For guidance, note that the assembly 1 is designed to be surrounded by a pod (not shown) and that the attachment pylon 4 comprises another series of attachments (not shown) to assure suspension of this assembly 1 under the aircraft wing.

Throughout the following description, by convention, X refers to the longitudinal direction of the pylon 4 that is also considered to be the same as the longitudinal direction of the turbojet 2, this direction X being parallel to a longitudinal axis 5 of this turbojet 2. Furthermore, the direction transverse to the pylon 4 is called Y and can be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

In FIG. 1, it can be seen that only the engine attachments 6, 8, 9 and the rigid structure 10 of the attachment pylon 4 are shown. The other components of this pylon 4 that are not shown, such as the attachment means of the rigid structure 10 under the aircraft wing, or the secondary structure for segregation and maintenance of systems while supporting aerodynamic fairings, are conventional elements identical to or similar to those encountered in prior art and known by those skilled in the art. Consequently, no detailed description of them will be made.

The rigid structure 10 is in the form of a conventional box formed from an upper spar 18 and a lower spar 20 both extending along the X direction and approximately in an XY plane or slightly inclined from the NY plane, and by two lateral panels 22 (only one being visible in FIG. 1) both extending along the X direction and approximately in an XZ plane. Transverse ribs 24 inside this box arranged along the YZ planes and at a longitudinal spacing reinforce the stiffness of the rigid structure 10. Note for guidance that each of the elements 18, 20, 22 may be made in a single piece, or by the assembly of adjacent sections.

Secondly, the turbojet 2 is provided with a large fan casing 12 at the front delimiting an annular fan duct 14, and being provided near the aft end with a smaller central casing 16 enclosing the core of this turbojet. Finally, the central casing 16 is prolonged in the aft direction by an ejecting casing 17 that is larger than the casing 16. Obviously, the casings 12, 16 and 17 are rigidly fixed to each other.

As can be seen in FIG. 1, the plurality of engine attachments is composed of a forward engine attachment 6, an aft engine attachment 8 actually forming two aft half-attachments, and an attachment 9 forming a device to resist thrusts generated by the turboengine 2. As shown diagrammatically in FIG. 1, this device 9 may for example be in the form of two lateral connecting rods (only one being visible because it is a side view) connected firstly to an aft part of the fan casing 12, and secondly to a spreader beam fitted on the aft attachment 8. Note also that the aft ends of these connecting rods can alternately be connected to a spreader beam forward from the aft attachment.

The forward engine attachment 6, fixed to the pyramid 15 of the rigid structure 10 and to the fan casing 12, is conventionally designed so that it can resist only forces generated by the turbojet 2 along the Y and Z directions, and therefore not forces applied along the X direction. For guidance, this forward attachment 6 preferably penetrates into an internal portion of the fan casing onto which the fixed blades of the fan are mounted, and that is close to a forward end of the central casing.

The aft engine attachment 8 is a special feature of the invention and is described in more detail with reference to FIGS. 2 to 5. It is globally inserted between the ejecting casing 17 and the rigid structure 10 of the pylon. It is preferably designed to form two half-attachments arranged symmetrically about a plane P defined by the axis 5 and the Z direction, each of these half-attachments being designed to be able to resist forces generated by the turbojet 2 along the Z direction, but not forces applied along the X and Y directions. Moreover, this aft attachment could also be capable of resisting forces generated by the turbojet 2 along the Y direction with a central portion.

Figure 1A:
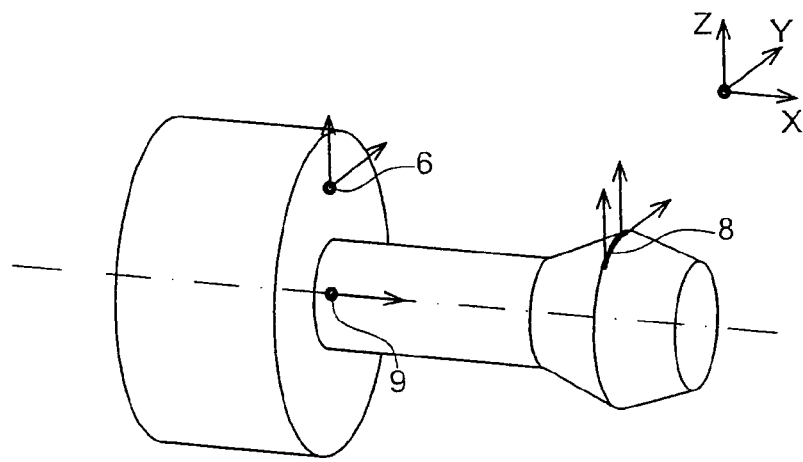
FIG. 1a is a view diagrammatically showing the resistance of forces by each of the engine attachments of the assembly shown in FIG. 1.

In this way, as can be seen diagrammatically in FIG. 1*a*, forces applied along the X direction are resisted by the attachment 9, forces applied along the Y direction are resisted by the forward attachment 6 and the central portion of the aft attachment, and forces applied along the Z direction are resisted jointly by means of the forward attachment 6 and the two aft half-attachments.

Also, the moment applied about the X direction is resisted vertically by means of two half-attachments of the attachment 8, the moment applied about the Y direction is resisted vertically by means of the two half-attachments of the attachment 8 jointly with attachment 6, and the moment applied about the Z direction is resisted transversely through the central portion of the attachment 8, jointly with the attachment 6.

Figure 2:
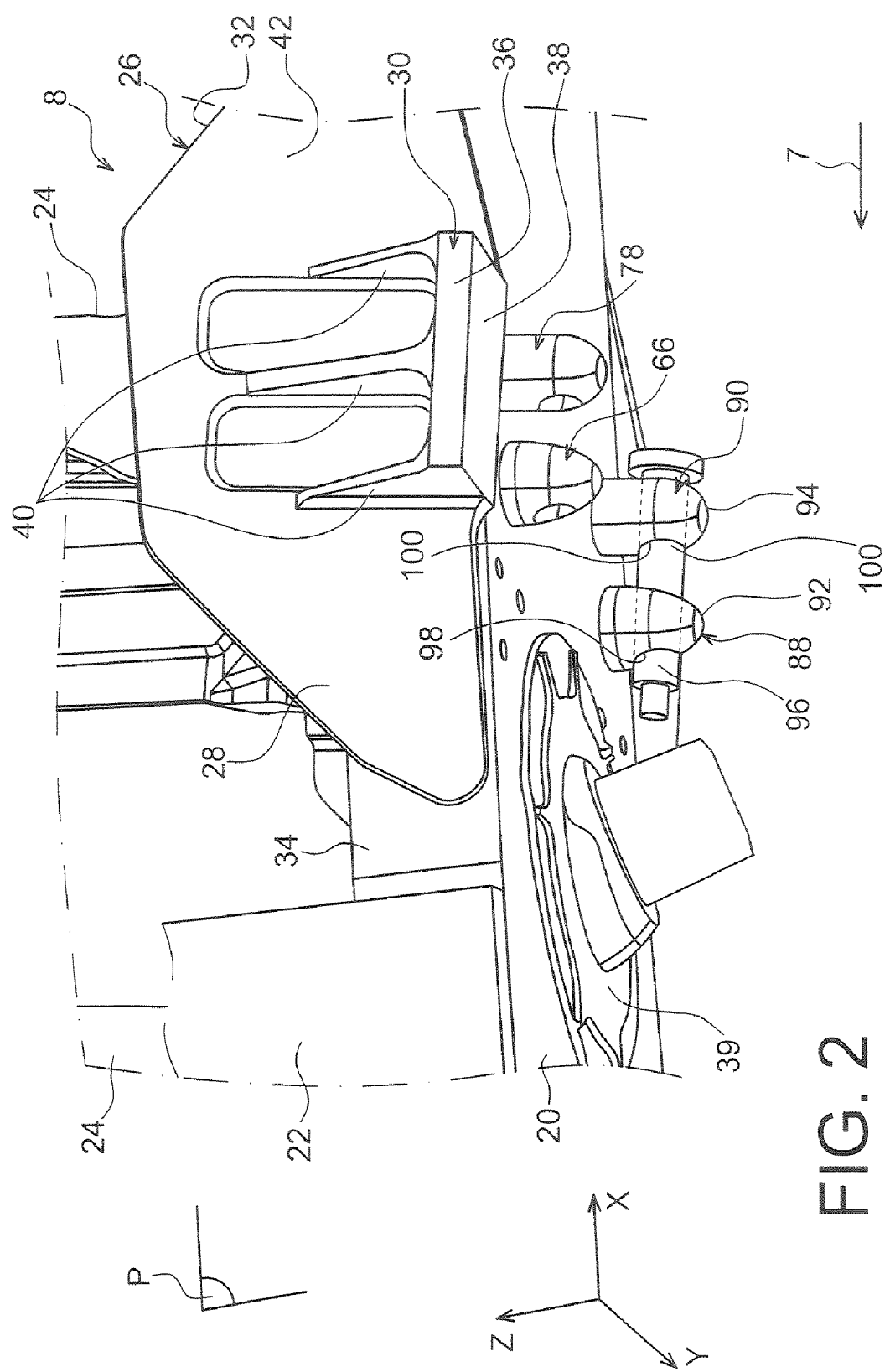
FIG. 2 shows a perspective view of part of the aft engine attachment of the pylon shown in FIG. 1.

FIG. 2 shows the aft engine attachment 8, in which some elements have been deliberately omitted for obvious reasons of clarity. We will firstly describe the part of the attachment 8 forming the two aft half-attachments each resisting only forces applied along the Z direction, and being arranged symmetrically about the above-mentioned plane P.

Therefore, the two aft half-attachments are identical and consequently only the right half-attachment will be described below. Globally, this half-attachment comprises a lateral bracket 26 composed of a longitudinal portion 28 and a transverse portion 30, and preferably has a plane of symmetry oriented along the Y and Z directions. Therefore the longitudinal portion 28 extends along the X direction approximately in an XZ plane, and comprises an inner face 32 in contact with a lateral flange 34 of the lower spar 20. For guidance, those skilled in the art know that this flange 34 is also oriented approximately along an XZ plane so as to enable assembly of the lateral panel 22 on this spar 20, for example by riveting and/or fish-plating.

The transverse portion 30 comprises an attachment plate 36 defining an attachment interface 38 for an aft attachment body (not shown in this FIG. 2), this interface 38 being in the form of a plane surface oriented in an XY plane. Secondly, it comprises reinforcing ribs 40 fixed to the upper face of the attachment plate 36 and the outer face 42 of the longitudinal portion 28, these ribs 40 being oriented along parallel YZ planes. Preferably, it would be possible that the interface 38 should be approximately along lateral continuity of a lower surface of the spar 20 as can be seen in FIG. 2.

Figure 3:
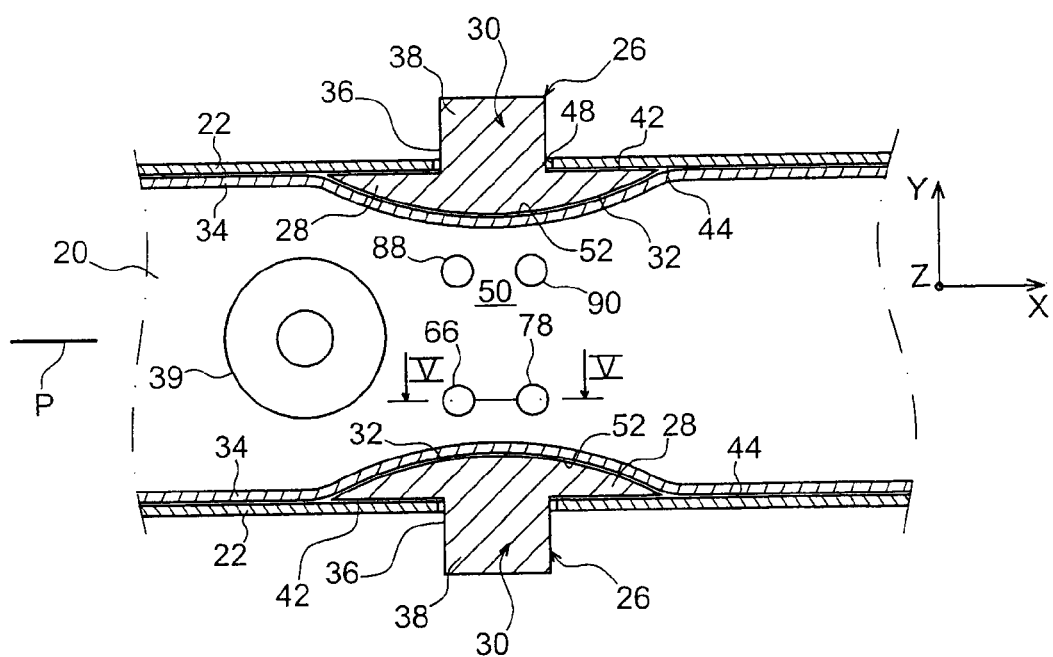
FIG. 3 shows a bottom view of the part shown in FIG. 2.
Figure 4:
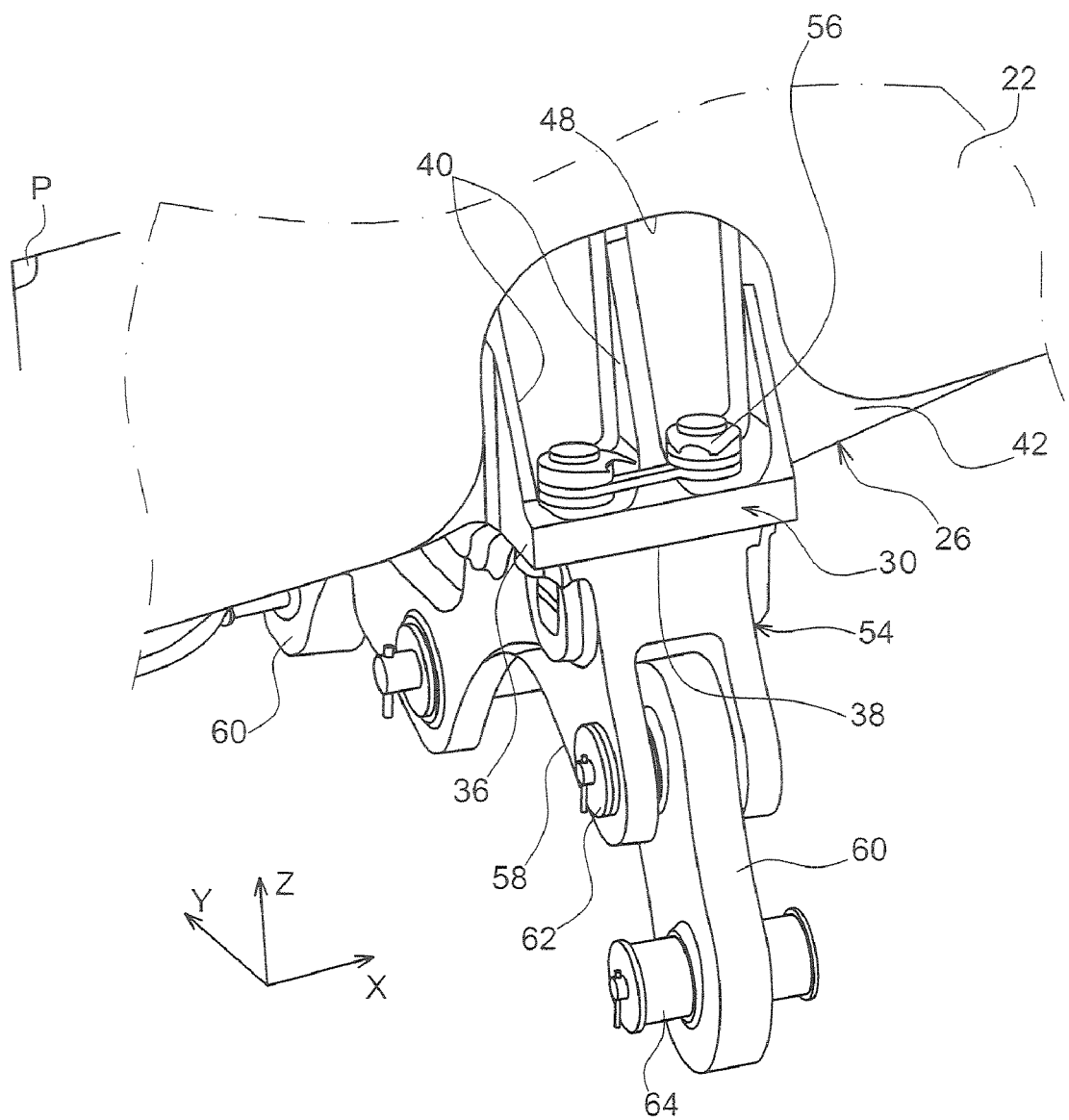
FIG. 4 shows a view similar to that shown in FIG. 2, the missing elements of the aft engine attachment having been added.

With reference now more specifically to FIGS. 3 and 4, it can be seen that one of the special features of the invention is in the fact that the outer face 42 of the longitudinal portion 28 is in contact with an inner face 44 of the lateral panel 22 associated with it. Consequently, the longitudinal portion 28 is trapped between the lateral panel 22 and the flange 34 of the lower spar 20, these three directly superposed elements being assembled to each other, preferably by fish-plating.

To enable the transverse portion 30 to project laterally outwards from panel 22, this panel is provided with a recess 48 open downwards and through which the transverse portion passes. Therefore in this configuration, at least one part of the attachment plate 36 is located beyond the panel 22 in the Y direction as can be clearly seen in FIG. 3. FIG. 4 shows that the cut out of the recess 48 is formed so as to allow the ribs 40 to pass through, which therefore also pass through this recess 48 to project laterally outwards from the panel 22.

Once again with reference to FIG. 3, it can be seen that the lower spar 20 is provided with a narrowing 50 along the Y direction, this narrowing 50 being formed by two indents 52 in which two lateral brackets 26 of the two aft half-attachments fit. Therefore, the inner face 32 of the longitudinal portion 28 is in contact with the indent 52 defined by the flange 34 of the lower spar, this flange portion consequently being provided with a slight curvature towards the inside of the box.

The geometry of the indent 52 is determined such that the longitudinal portion 28 housed within it has an outer face 42 that is approximately continuous with the outer face of the right part of the flange of the spar 20, so as to form a plane support surface approximately oriented along an XZ plane for the panel 22.

Now with reference more specifically to FIG. 4, each lateral bracket 26 that is preferably made in a single piece and from titanium, is therefore fixed to the aft attachment body 54 arranged transversely below the lower spar 20. Therefore this body 54, which also includes the plane P as a plane of symmetry, is in contact with the attachment interface 38 and is fixed to it through vertical bolts 56 passing through the attachment plate 36 and an upper part of this body 54.

The body 54 then comprises a clevis 58 forming an integral part of the right aft half-attachment, onto which an end fitting 60 is articulated through a pin 62 oriented along the X direction. As can be seen in FIG. 4, the end fitting or the rod 60 is inclined from the vertical, so that it becomes closer to plane P in the upward direction.

For information, a second pin 64 also oriented along the X direction is also provided at a lower end of the end fitting 60, so as to articulate this end fitting onto a bracket/clevis (not shown) rigidly fixed to the turbojet casing 2. Consequently, it can therefore be understood that each aft half-attachment comprises the articulated end fitting 60, the clevis 58 and the bracket 26, the two devises 58 of the two half-attachments also being connected within the same aft attachment body 54, preferably made from a single piece.

The above description shows that the aft attachment 8 forms two half-attachments, each capable of resisting forces applied along the Z direction. In the invention, it is planned that the aft attachment 8 is also capable of resisting forces applied along the Y direction.

Figure 5:
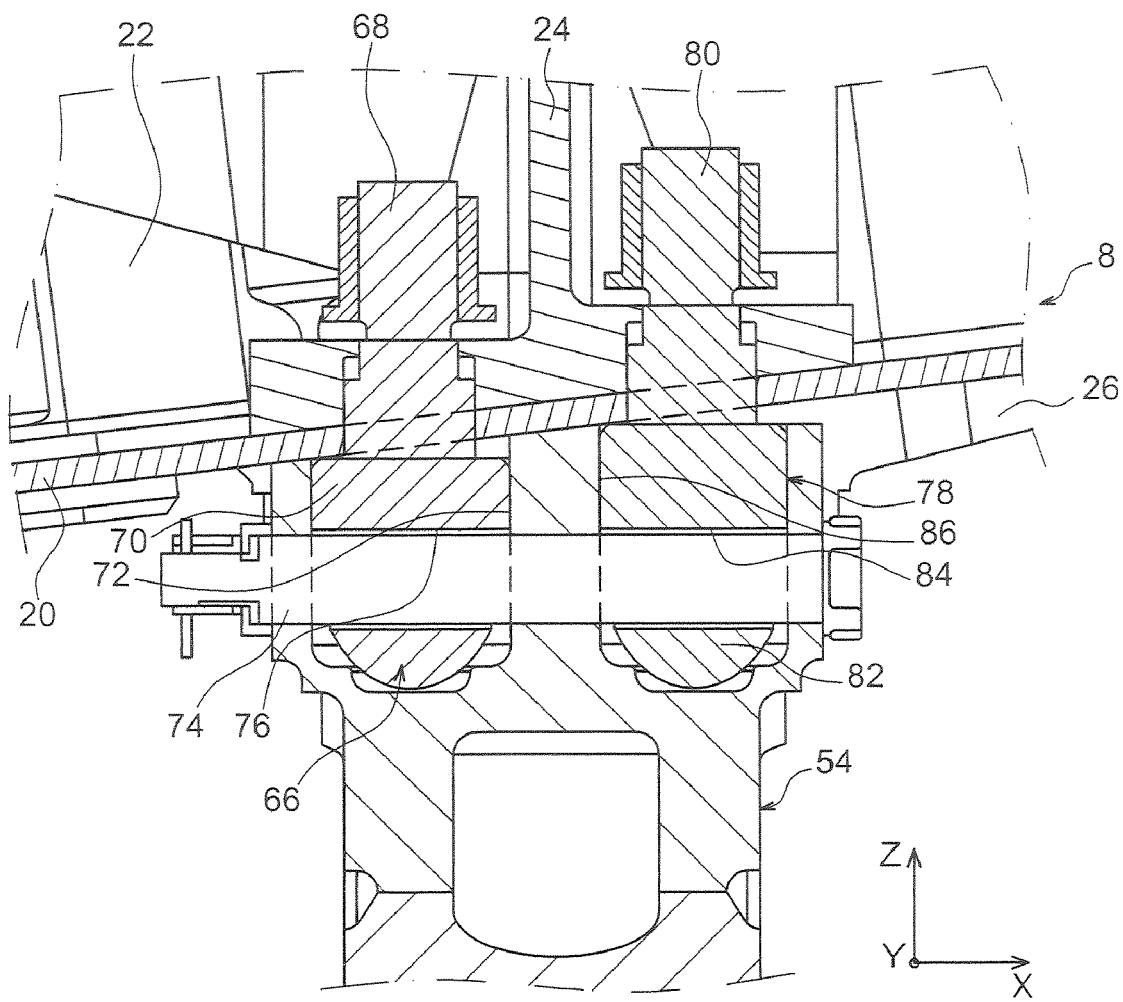
FIG. 5 shows a sectional view taken along line V-V in FIG. 3.

With reference to FIGS. 2, 3 and 5 jointly, to achieve this it is arranged that the aft engine attachment 8 also comprises a first shear pin 66 oriented along the Z direction, this pin 66 being designed to resist forces applied along the Y direction and more particularly to allow passage of these forces between the aft attachment body 54 and the rigid structure 10 of the attachment pylon.

The pin 66 comprises an upper end 68 (only visible in FIG. 5) located at one of the transverse ribs 24 in the form of a frame, this end 68 also occupying a projecting position on the inside of this frame, making it easily accessible. The pin 66 is then prolonged downwards, passing in sequence through the lower part of the rib 24 concerned and the lower spar 20. It then comprises a lower end 70 projecting downwards from the spar 20 of the box, and is housed in an orifice 72 of the aft attachment body 54. Therefore, the contact between the surface of this end 70 and the surface of the orifice 72 resists forces along the Y direction. For guidance, note that the orifice 72 has a globally oval shape approximately complementary to the shape of the shear pin 66, and is in the form of a blind hole in the upper part of the attachment body 54.

If this embodiment that has just been described is more or less similar to the embodiments already encountered in prior art for the resistance of transverse forces, one of the special features of the invention lies in the fact that a first pin 74 is provided passing in sequence through a forward part of the body 54, a reaming 76 formed in the lower end 70 of the pin 66, and a central part of the same body 54.

With this particular arrangement in which the pin 74 is a pin-shaped pin preferably oriented along the X direction, the cooperation between the reaming 76 and the pin 74 consequently providing the means of resisting forces applied along the Z direction in the case of a failure/breakage of one of the two lateral brackets 26, and in particular the bracket fitted on the right aft half-attachment due to the proximity between the first pin 66 and this right half-attachment. This advantageously enables a so-called <<Fail Safe>> function for transmission of forces along the Z direction, without significantly increasing the complexity of the design of the body 54. Furthermore, note that a clearance is provided between the pin 74 and the reaming 76, such that the force path will only be functional if there is a failure/breakage of the right aft half-attachment.

In order to reinforce this <<Fail Safe>> function related to the right aft half-attachment, the aft engine attachment 8 also comprises a first ancillary pin 78 aligned with the shear pin 66 along the direction of the pin X, and therefore preferably along the X direction. Obviously, the direction of the pin 74 could be different while preferably remaining in an XY plane, without going outside the framework of the invention.

The design of this pin 78 is similar to the design of the pin 66 described above. Thus, it comprises an upper end 80 (visible only in FIG. 5) also located at the above mentioned transverse rib 24, this end 80 occupying a projecting position inside the frame formed by this rib, which makes it easily accessible. The pin 78 is then extended downwards passing successively through the lower part of the rib 24 concerned and the lower spar 20. It then comprises a lower end 82 projecting downwards from the spar 20 of the box, and being housed in an orifice 86 of the aft attachment body 54. Prefer-ably, and always so as to make the engine attachment system statically determinate and to prevent the first ancillary pin 78 from resisting forces applied along the Y direction, it could be arranged for a clearance between the end surface 82 and the surface of the orifice 86. Once again, note that the orifice 86 has a globally oval shape approximately complementary to the shape of the ancillary pin 78, and is in the form of a blind hole formed in the upper part of the attachment body 54.

As can be seen in FIG. 5, the aft attachment 8 is designed such that the pin 74 projecting from the central part of the body 54 then passes in sequence through a reaming 84 formed in the lower end 82 of the pin 78 and an aft part of the same body 54, until it opens up outside it. Once again, note that a clearance is provided between the pin 74 and the reaming 84, to assure that the force path composed of elements 74 and 82 is only functional following a failure/breakage of the right aft half-attachment.

The aft attachment 8 includes a mounting similar to that described above, but that is associated with the left aft half-attachment, particularly in order to provide the <<Fail Safe>> function to transmit forces along the Z direction normally performed by this left aft half-attachment. A second shear pin 88 and a second ancillary pin 90, identical to pins 66 and 78 respectively are also provided, these second pins 88, 90 being provided with lower ends 92, 94 housed in the body 54 and through which a second pin 96 passes at the reamings 98 and 100. Thus, it should be understood that the pin/pin assembly associated with the left aft half-attachment is symmetric about plane P of the pin/pin assembly associated with the right aft half-attachment, the only difference between these two assemblies being the required clearance between the second shear pin 88 and its associated orifice (not shown) formed in the aft attachment body. Once again, in this case this clearance is chosen such that the second pin 88 only performs the <<Fail Safe>> function to transmit forces along the Y direction if a failure occurs in the first shear pin 66.

Obviously, various modifications could be made by those skilled in the art to the attachment pylon 4 of the turbojet 2 for an aircraft that has just been described, solely as a non-limitative example. In this respect, it is worth mentioning that although the pylon 4 has been presented in an adapted configuration for it to be suspended under the aircraft wing, this pylon 4 could also be presented in a different configuration so that it could be mounted above this wing.

The invention claimed is:

1. An engine attachment pylon for an aircraft, comprising:
an assembly of an upper spar, a lower spar, first and second lateral panels, and transverse ribs connecting the spars and panels; and
an aft engine attachment fitted with an aft attachment body, wherein the aft engine attachment includes first and second lateral brackets, each of the first and second lateral brackets includes a longitudinal portion which extends in a longitudinal direction of the pylon and a transverse portion which extends in a transverse direction of the pylon,
wherein an outer face of the longitudinal portion of the first and second lateral brackets each contacts an inner face of the first and second lateral panels, respectively, in the transverse direction of the pylon and the longitudinal portion of the first and second lateral brackets each is mounted fixed on the inner face of the first and second lateral panels, respectively,
wherein the transverse portion of the first and second lateral brackets each includes an attachment interface for the aft attachment body and the transverse portion of the first and second lateral brackets each passes through a recess formed on the first and second lateral panels, respectively, and wherein the transverse portions of the first and second lateral brackets extend in the transverse direction of the pylon beyond the first and second lateral panels, respectively.

2. An attachment pylon according to claim 1, wherein the lower spar includes a narrowing composed of first and second indents in which the first and second lateral brackets of the aft engine attachment are housed.

3. An attachment pylon according to claim 1, wherein the recess of each of the first and second lateral panels is provided on a bottom portion of the lateral panel.

4. An attachment pylon according to claim 1, wherein the lower spar includes first and second lateral flanges installed fixed on the first and second lateral panels, and the longitudinal portion of each of the first and second lateral brackets of the aft attachment is inserted between the two first and second lateral flanges and the first and second lateral panels, respectively.

5. An attachment pylon according to claim 4, wherein an inner face of the longitudinal portion of the first and second lateral brackets abuts the first and second lateral flanges, respectively.

6. An attachment pylon according to claim 1, wherein the transverse portion of the first and second lateral brackets of the aft attachment each includes an attachment plate defining an attachment interface of the aft attachment body, and reinforcing ribs fixed to the attachment plate and the longitudinal portion.

7. An attachment pylon according to claim 6, wherein the reinforcing ribs are oriented along parallel planes defined by the transverse direction of the pylon and a vertical direction of the pylon.

8. An attachment pylon according to claim 6, wherein the attachment interface of each of the first and second lateral brackets of the aft attachment is in a form of a plane surface oriented in the direction of a plane defined by the transverse direction and the longitudinal direction of the pylon.

9. An attachment pylon according to claim 1, wherein each of the first and second lateral brackets of the aft attachment is in a single piece.

10. An attachment pylon according to claim 1, wherein each of the first and second lateral brackets of the aft attachment includes titanium.

11. An attachment pylon according to claim 1, wherein the aft attachment is configured to define two half-attachments, each configured to resist forces applied along a vertical direction of the pylon.

12. An attachment pylon according to claim 1, wherein the aft engine attachment further includes a first vertical shear pin configured to resist forces applied along the transverse direction of the pylon, the first vertical shear pin passing through the lower spar and including a lower end housed in the aft attachment engine, the lower end of the first vertical shear pin including a longitudinal reaming through which a first longitudinal pin passes, the first longitudinal pin also passing through the aft attachment body.

13. An attachment pylon according to claim 12, wherein the aft engine attachment further includes a second vertical shear pin configured to resist forces applied along the transverse direction of the pylon, only if a failure occurs in the first vertical shear pin, the second vertical shear pin passing through the lower spar and including a lower end housed in the aft attachment body, the lower end of the second vertical shear pin including a longitudinal reaming through which a second longitudinal pin passes, that also passes through the aft attachment body.

14. An attachment pylon according to claim 13, wherein the aft engine attachment further includes a first vertical ancillary pin passing through the lower spar and including a lower end housed in the aft attachment body, the lower end of the first vertical ancillary pin including a longitudinal reaming through which the first longitudinal pin passes.

15. An attachment pylon according to claim 14, wherein the aft engine attachment further includes a second vertical ancillary pin passing through the lower spar and including a lower end housed in the aft attachment body, the lower end of the second vertical ancillary pin including a longitudinal reaming through which the second longitudinal pin passes.

16. An attachment pylon according to claim 15, wherein the first and second longitudinal pins are oriented along the longitudinal direction of the pylon.

17. An attachment pylon according to claim 15, wherein first and second vertical shear pins and the first and second vertical ancillary pins each have an upper end passing through a same transverse rib of the pylon.

18. An aircraft comprising at least one attachment pylon according to claim 1.

19. An attachment pylon according to claim 1, wherein the first and second lateral panels are substantially parallel to the longitudinal direction of the pylon.

* * * * *